United States Patent [19] 17; [11] 4,051,772
Johansson et al. [45] Oct. 4, 1977

[54] MACHINE FOR DISPENSING HEATED SAUSAGE FROM A COLD STORAGE COMPARTMENT

[76] Inventors: Reinhold A. Johansson, Ostra Hasselbacken 17; Arne B. Svensson, Wilhelmsbergsvagen 8, both of 56100 Huskvarna, Sweden

[21] Appl. No.: 639,247

[22] Filed: Dec. 9, 1975

[30] Foreign Application Priority Data

Dec. 9, 1974 Sweden ............................... 7415342
Sept. 19, 1975 Sweden ............................... 7510510

[51] Int. Cl.[2] ............................................. A47J 27/66
[52] U.S. Cl. ........................................ 99/427; 99/441; 219/10.55 A; 221/150 A; 221/237
[58] Field of Search .............. 221/66, 150 HC, 150 A, 221/237, 266, 277, 290, 298; 193/32; 99/427, 441; 219/10.55 R, 10.55 A, 10.55 M; 426/243

[56] References Cited

U.S. PATENT DOCUMENTS

| | | | |
|---|---|---|---|
| 1,061,926 | 5/1913 | Ratzlaff | 221/266 X |
| 2,363,724 | 11/1944 | Ford | 221/150 HC X |
| 2,384,863 | 9/1945 | Warner | 99/441 X |
| 3,333,666 | 8/1967 | Murray et al. | 221/150 HC X |
| 3,866,795 | 2/1975 | Urano | 221/150 HC |
| 3,893,557 | 7/1975 | Frenk | 193/32 |
| 3,911,805 | 10/1975 | Baird | 99/427 X |

*Primary Examiner*—Robert B. Reeves
*Assistant Examiner*—Fred A. Silverberg
*Attorney, Agent, or Firm*—Ulle C. Linton

[57] ABSTRACT

A coin-operated machine for dispensing heated sausage from a cold storage compartment where the sausages are kept in a frozen condition. Two superposed rollers being rotated step by step in synchronism about a horizontal axes in a vertical portion of a chute and each roller being provided with a peripheral recess to receive one sausage with the top roller sealing the chute and segregating one sausage which it drops into the recess of the bottom roller. The sausage in the bottom roller recess is then exposed to a source of radiation of microwaves for heating. While so exposed, a secondary rotor element rotates the sausage. The heated sausage is then dropped from the bottom roller into a dispensing chute.

4 Claims, 5 Drawing Figures

MACHINE FOR DISPENSING HEATED SAUSAGE FROM A COLD STORAGE COMPARTMENT

This invention refers to a device for treating and transporting sausages and similar products.

The device is intended to form part of a slot machine. Primarily, but not exclusively, said slot machine is intended to sell ready made dishes such as hot dogs.

In treating foodstuffs, which before dispensing are to be heat treated, it is important that said treatment can be performed at uniform and controlled conditions. This is especially important in treating frozen foodstuffs.

Thus, an important object of the invention is to obtain a machine permitting such uniform and controlled treatment of the foodstuff.

Further, in vending machines of the type referred to it is of special importance, due to the freshness of the food, that the risk for operational disturbances is minimized.

Thus, another important object of the invention is to provide a device which due to a simple and sturdy construction meets this requirement.

Other objects and characteristics of the invention will be apparent from the following description, claims and drawings.

The accompanying drawings illustrate an examplifying embodiment of the invention.

The illustrated embodiment of the invention is for use in a vending machine for vending hot dogs and bread. As the mechanisms of a vending machine are well known in the art and forms no part of the invention such mechanisms are not herein described.

Figure 1:
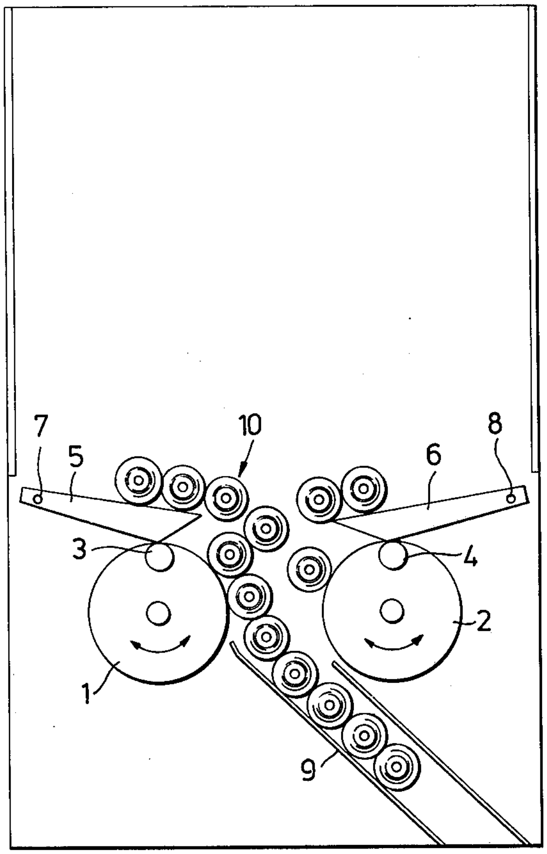
FIG. 1 is a schematic side view of a storage forming part of a vending machine and intended to contain sausage, contained in sleeves.

In order to make the vending machine suitable for dispensing hot dogs, which are stored in a relatively great number in the slot machine, a storage is utilized into which the sausages housed in sleeves, may be filled not one by one but in a greater number. In such storages it is of course crucial that the sausages may succesively be given a selected orientation in which they may leave the storage one by one by means of their own gravity. To accomplish this a mechanism as shown in FIG. 1 may be used. It is to be noted that the mechanism according to FIG. 1 forms no part of the invention and is only illustrated to show how the sausages from a storage compartment may reach the device illustrated in FIG. 2. The mechanism according to FIG. 1 comprises two rollers 1, 2, respectively, which are driven forwards and backwards approximately 180° according to the arrows of FIG. 1. Projections 3 and 4, respectively, are secured to each of the rollers and said projections alternatively raise shelves 5, 6 by the movement of said rollers. Said shelves are pivotally mounted at 7 and 8, respectively. As may be seen in FIG. 1 these shelves are preferrably slightly inclined downwardly towards the center of the storage. This mechanism directs the products in such a manner that one by one they may leave the storage through the inclined chute 9. Despite the products having been completely disorientated and of random direction in relation to the chute they will by means of the mechanism now described, dut to their own gravity pass the chute in an oriented manner.

Figure 3:
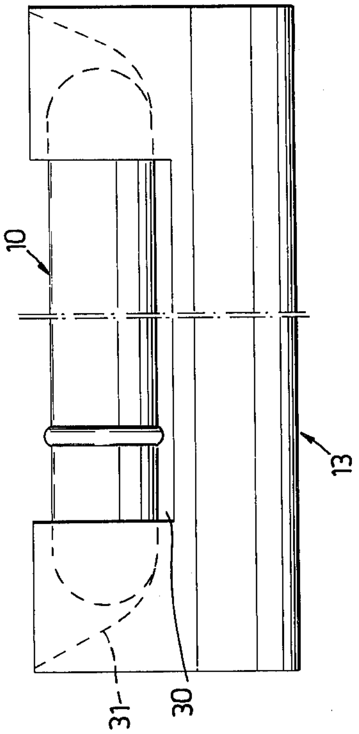
FIG. 3 is a side elevation of the upper roller according to FIG. 2 and a sleeve holding a sausage.
Figure 2:
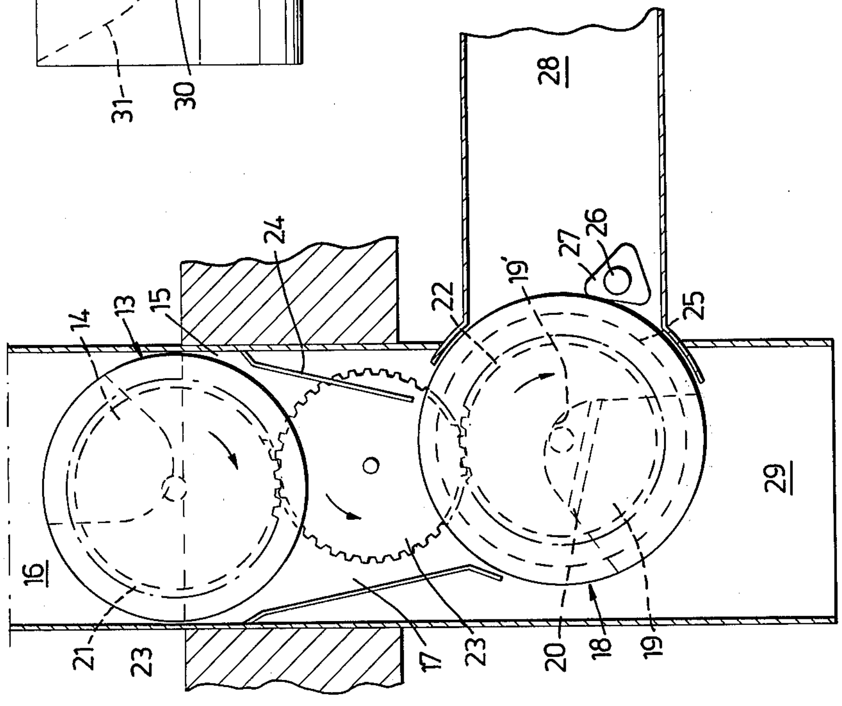
FIG. 2 is a sectional view through a device incorporated in the vending machine and intended to treat transport and dispense the sausage.

FIGS. 2 and 3 show the device according to the invention. The products arrive one by one from the above described storage to the upper portion of the device shown in FIG. 2. Each sausage is housed in a sleeve preferrably of the structure shown in FIG. 4.

Figure 4:
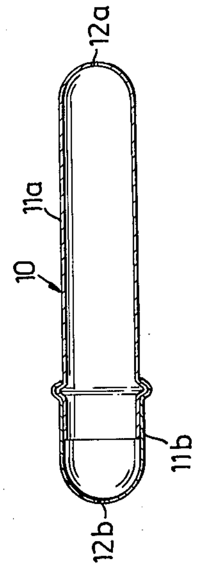
FIG. 4 is a longitudinal section through a sleeve according to FIG. 3.

The sleeve, having the general designation number 10, comprises two parts 11*a*, 11*b*, telescopically fitting into each other, and said parts are provided with openings 12*a*, 12*b* in the ends thereof for a purpose to be described. Preferably, the sleeves are made from a plastic material that is not adversely affected by the actual heat treatment. In the following description the term sausage sleeve will be used for a sleeve 10 such as shown in FIG. 4, containing one or several sausages.

In FIG. 2 numeral 13 designates an upper roller provided with a recess 14 for a sausage sleeve 10. Said roller is located in a passage 15 between a refrigerated space 16 and a treatment space 17 and is sealingly fitted in said passage so that it separates said spaces from each other. The roller may be rotated about a horizontal axis and should be turned in a step wise manner. In the pick-up position of said roller the recess 14 thereof is facing upwardly so that a sausage sleeve from the refrigerated space may fall down into the recess by means of its own gravity. A lower roller 18, also mounted about a horizontal axis is provided and a recess 19 that may receive a sausage sleeve. Said lower roller is provided with a pin 20 projecting into this recess for a purpose to be described. The rollers are synchronously driven and for this purpose the upper roller 13 is rigidly secured to a gear wheel 21 and the lower roller is rigidly secured to another gear wheel 22. The two gear wheels are in mesh with an intermediate gear wheel 23. Further, guiding plates 24 for the sausage sleeve are provided in the passage 15. Annular recesses 25 are provided in the lower roller permitting rotor elements 27, rotatable about a horizontal axis 26, to reach into the recess 19. A micro wave treating means is designated by 28 and an outlet chute is designated by 29. The treated sausage is to pass through said chute 29 to be dispensed.

It is important that the sausages, which are frozen and located in a cold store, are kept cold until the period of treatment. To accomplish this the recess 14, according to FIG. 3, is grooved so that a space 30 is defined beneath the sausage sleeve, and this space permits cold air to surround the sleeve. In order to guide the ends of the sausage sleeve the end portions 31 of the recess are designed as shown in FIG. 3.

The described treating unit operates in the following manner:

A sausage sleeve, containing a frozen sausage, reaches the recess 14 from the cold storage, preferably by means of the mechanism according to FIG. 1. The roller is then turned until the recess 14 faces downwardly. The sausage sleeve then leaves the roller 13 by means of its own gravity. By means of the synchronism the roller 18 then has the recess 19 thereof facing upwardly so that said sausage sleeve is introduced into said recess.

Then, the roller 18 is turned until the recess 14 faces the source 28 of micro waves. In this position the rotating rotor 27 engages the sausage sleeve and rotates it around its own axis. By means of the pin 20 the sausage sleeve is kept out of contact with the bottom 19′ of the recess 19, which is made reflective so that the micro waves reach all the portions of the sausage sleeve. An extremely uniform and even treatment of the sausage is achieved by the rotation. The generated fumes are removed through the openings 12*a*, 12*b* of the sausage sleeves. Thereafter, the roller 18 is moved until the recess 19 thereof faces downwardly, causing the sausage sleeve to fall down into the outlet chute 29.

In the machine described it is intended that the customer shortly after insertion of the coin may receive a piece of bread and small sachets containing for example mustard, ketchup and similar, and during the period required to take these things out from the machine the preparation of the sausage according to the description above may be accomplished. In order to make bread with appliances dispensable by means of their own gravity and to make the charging of the slot machine as simple as possible while keeping the largest secure operation possible, a device according to FIG. 5 may be used.

Figure 5:
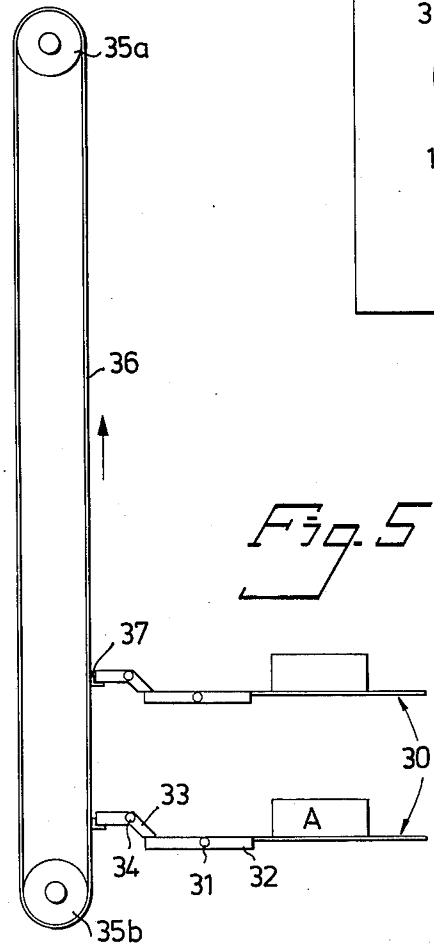
FIG. 5 is a schematic side view of a storage for bread and appliances.

In this embodiment a number of shelves 30 are positioned above each other, only two of which being shown in FIG. 5. Said shelves are pivotally or rotateably mounted about horizontal shafts 31 and are suitably provided with counter weight portions, which substantially balance the shelves. Each shelve is kept in the position thereof illustrated in FIG. 5 by means of a stop latch 33, one provided for each shelf and journalled around a shaft 34 and prevented from swinging anticlockwise from the position shown. When the shelf has been brought into this position the pacakge A to be dispensed is placed upon the shelf and for example by running from below and upwards all the shelves of the storage are filled in a short period of time. After insertion of a coin a drive means for operating an endless belt 36 running over two pulleys 35*a*, 35*b* are released and said belt has a releasing projection 37. The belt is driven in a step-wise manner over a distance corresponding to the distance between two shelves and the driving direction may be seen in FIG. 5. In this feeding step, the corresponding stop latch 33 will be swung clock-wise to such an extent that the actual shelf 30 is released. The package positioned on the shelf will thereby cause the shelf to swing in a clock-wise direction by means of its gravity, which in turn results in that the pacakge due to the gravity thereof leaves the storage and moves towards an outlet or dispensing opening provided in the slot machine. Naturally, by the next operation of the belt the shelf positioned immediately above will be brought to the dispensing position etc, until the storage becomes empty.

We claim:

1. A device for treating and transporting sausages, farming part of a vending machine, comprising a roller having a recess therein to receive said sausage, said roller being rotatably mounted about a horizontal axis permitting said product to fall down by means of its own gravity into said recess when said roller is in a first angular position and in a second angular position of said roller the recess of said roller being so located that the product received therein is subjected to micro waves, a rotor means being provided to rotate the product in said recess in said second angular position of said roller in order to rotate said product about its longitudinal axis, said recess of said roller in a third angular position of said roller being in register with an outlet opening through which the product leaves said roller by gravity.

2. A device as claimed in claim 1 including sleeves each capable of receiving at least one sausage, and said sleeves being in two parts with holes being provided in the ends of said sleeves.

3. A device as claimed in claim 1 wherein the bottom of said recess is spherical and at least one pin is provided to prevent direct contact between said bottom and said product.

4. A device as claimed in claim 1 including a refrigeration area, a treating area, and wherein said rotatably mounted roller is sealingly positioned in a passage connecting said refrigeration area and said treating area such that said roller separates said areas from each other, a second roller having a recess to receive the product, said first roller being positioned above said second roller in said passage, means for synchronously driving said first and second rollers in such a manner that the product falling down from the recess of said first roller will fall down into the recess of said second roller, said second roller being positioned above an outlet opening through which said product may leave said treatment area when it has been transported by said first and second rollers.

* * * * *